United States Patent [19]

Mabry, Jr.

[11] 4,230,334
[45] Oct. 28, 1980

[54] CANTILEVERED MEDIAL TRAILER

[76] Inventor: Vern D. Mabry, Jr., 2560 Crowdis La., Ruscue, Calif. 95672

[21] Appl. No.: 5,386

[22] Filed: Jan. 22, 1979

[51] Int. Cl.³ .............................................. B62D 53/04
[52] U.S. Cl. ............................ 280/415 R; 280/423 R; 280/656
[58] Field of Search ........... 280/414 R, 414 A, 415 R, 280/415 A, 415 B, 423 R, 423 A, 43.23, 460 R, 656, 80 R, 80 B, 81 R; 180/24.02; 296/157, 158, 26.27

[56] References Cited

U.S. PATENT DOCUMENTS

| | | | |
|---|---|---|---|
| 2,119,263 | 5/1938 | Baumgardner | 280/460 R |
| 2,703,554 | 3/1955 | Haggard | 280/43.23 |
| 2,925,135 | 2/1960 | Hamilton | 280/415 B |
| 3,163,306 | 12/1964 | Bennett | 280/415 B |
| 3,348,859 | 10/1967 | Melbye | 280/415 R |
| 3,390,896 | 7/1968 | Philapy | 280/423 R |
| 3,420,566 | 1/1969 | Obra | 296/23 |
| 3,446,516 | 5/1969 | Modglin | 280/415 R |
| 3,542,414 | 11/1970 | Nelson | 280/423 R |
| 3,719,244 | 3/1973 | Miller | 180/14 R |
| 3,770,297 | 11/1973 | Quick | 280/423 R |
| 3,790,188 | 2/1974 | Johannes | 280/423 R |
| 3,811,706 | 5/1974 | Tucker | 280/423 R |
| 3,815,936 | 6/1974 | Oaks | 280/415 A |

Primary Examiner—John J. Love
Assistant Examiner—Randall A. Schrecengost
Attorney, Agent, or Firm—Blair, Brown & Kreten

[57] ABSTRACT

Disclosed herein is a cantilevered medial trailer for use in conjunction with a conventional ball and tongue trailer at one extremity of the medial trailer, and a towing vehicle adapted to pull both depending trailers by means of a conventional goose neck or fifth wheel. The rear trailer is connected to the medial trailer in such a fashion that the interposed trailer requires no rolling support and is completely supported by the last trailer and the towing vehicle.

7 Claims, 8 Drawing Figures

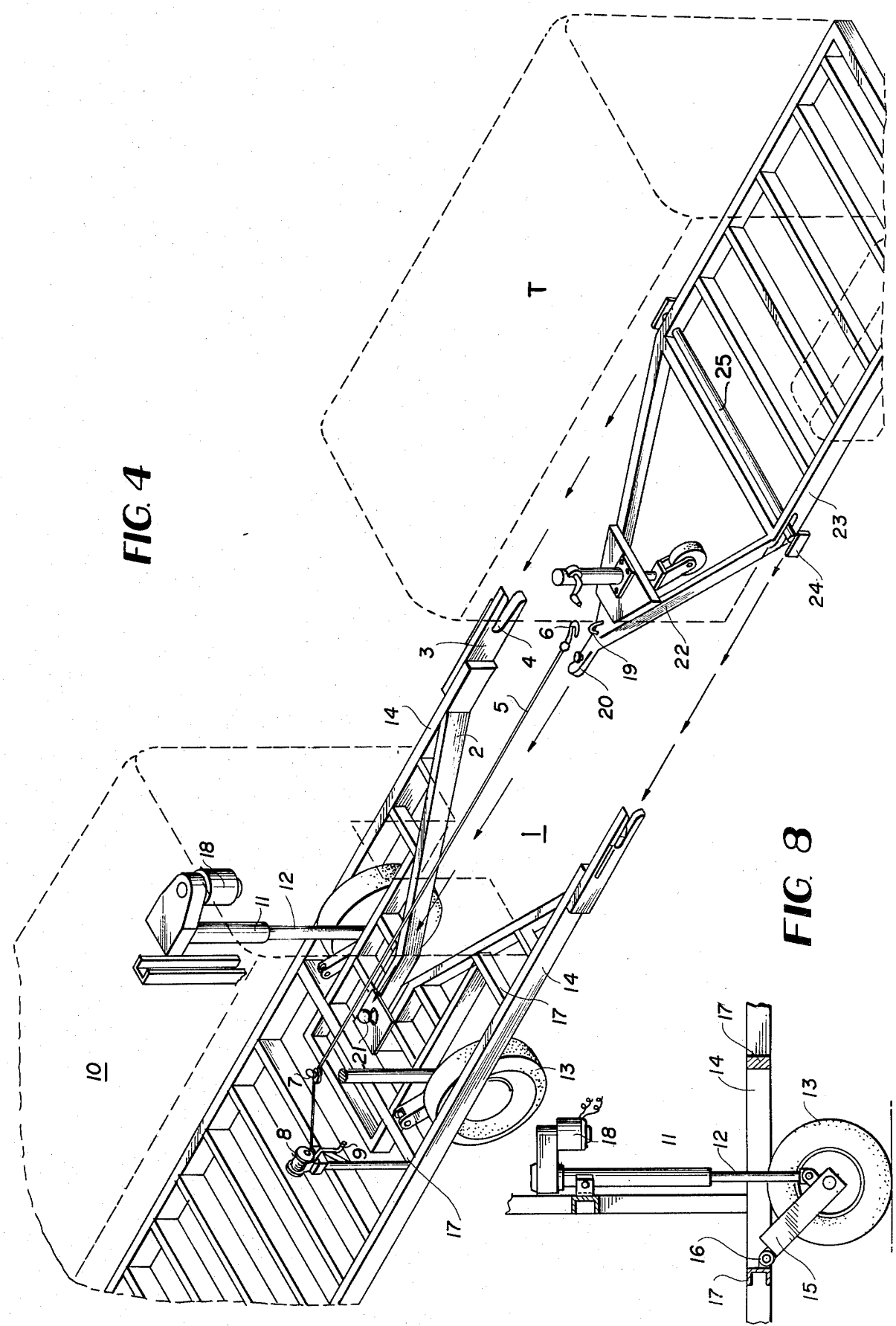

CANTILEVERED MEDIAL TRAILER

BACKGROUND OF THE INVENTION

It has been known in the prior art to serially interconnect a plurality of trailers to thereby provide a greater towing ability. Prior art devices of which applicant is aware include the following patents:

| | | | |
|---|---|---|---|
| 3,348,859 | Melbye | 3,770,297 | Quick |
| 3,390,896 | Philapy | 3,790,188 | Johannes |
| 3,420,566 | Obra | 3,811,706 | Tucker et al |
| 3,446,516 | Modglin | 3,815,936 | Oaks, Jr. |
| 3,542,414 | Nelson | | |

Of these references, perhaps Melbye is the most pertinent since he provides a nesting area between the two trailers to provide an interconnection therebetween. Deficiencies in his structure can be perceived in comparison to the instant application by noting that the support structure requires feed screws for relative alignment of the two trailers and further the support structure needs to have depending wheels operatively connected at all times.

SUMMARY AND OBJECTS OF THE INVENTION

Accordingly, the foregoing deficiencies have been remedied by providing a medial cantilevered trailer which requires no wheeled support while in transit, and is suitably constructed to accommodate conventional type trailers therebehind.

An object therefore is to provide a medial cantilevered trailer which can be hitched to a successive trailer by one person.

Further object of this invention contemplates providing a medial cantilevered trailer which operates with a towing vehicle whereby the interconnection between the two comprises a fifth wheel or goose neck.

It is yet another object of this invention to provide wheels for the medial trailer which are retractable.

It is still a further object of this invention to provide interconnection between the medial trailer and a following trailer which is easy to effect, and sound structurally along the lines of interconnection.

These and other objects will be made manifest when considering the ensuring detailed specification and appended drawings.

BRIEF DESCRIPTION OF THE DRAWINGS

FIG. 4 is an isometric view having the major panel portions cut away showing the interconnection between the medial trailer and the conventional end trailer;

FIG. 8 shows a detailed view of the medial trailer wheels and the apparatus for retracting the same.

DESCRIPTION OF THE PREFERRED EMBODIMENT

Figure 1:
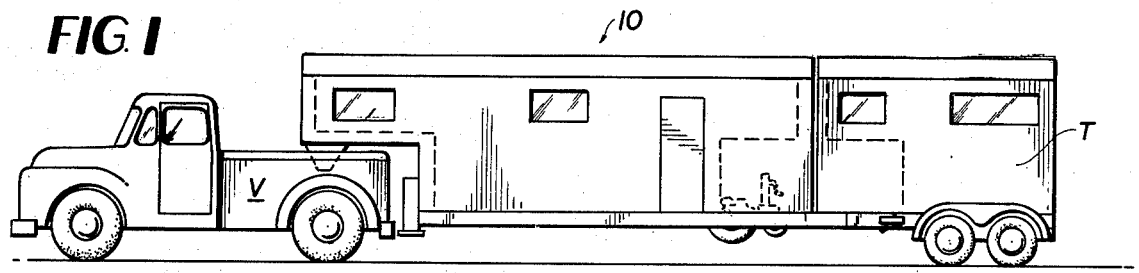
FIG. 1 is a side view of the trailer used in its environment.
Figure 2:
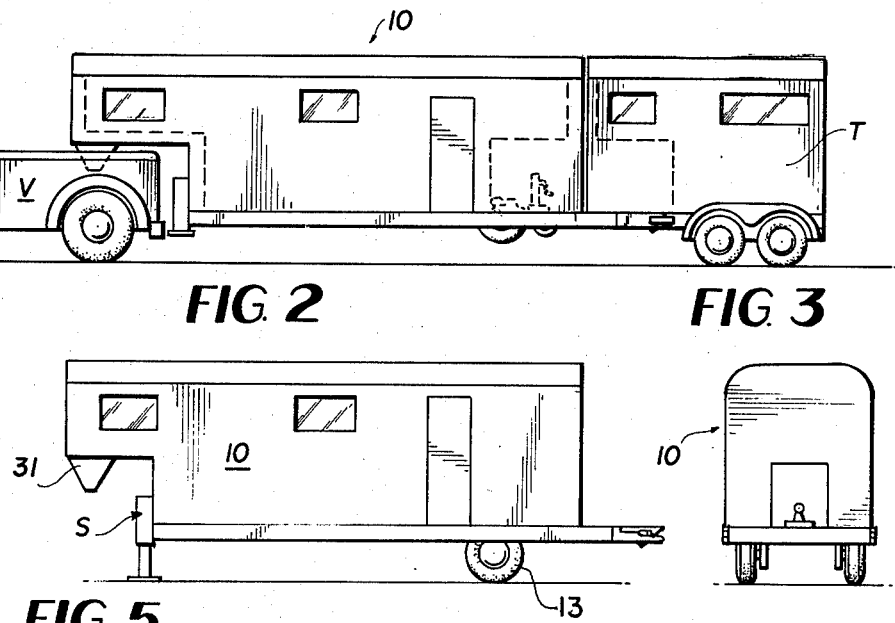
FIG. 2 shows the medial cantilevered trailer removed from the towing vehicle and depending trailer.
Figure 3:
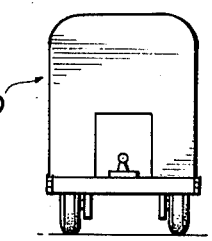
FIG. 3 is an end view of the medial trailer showing the interconnection area.
Figure 5:
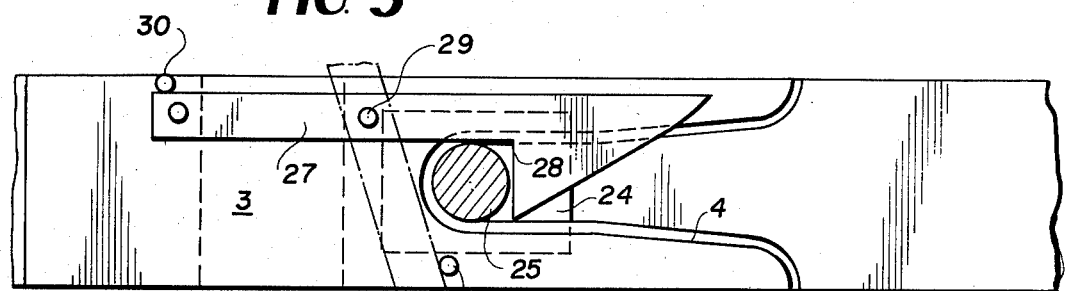
FIG. 5 shows a side view of one interconnection between these last two trailers.
Figure 6:
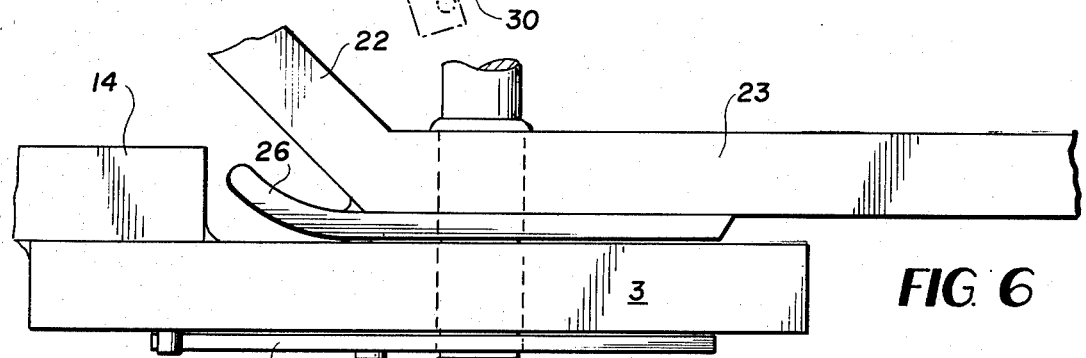
FIG. 6 is a top view thereof.
Figure 7:
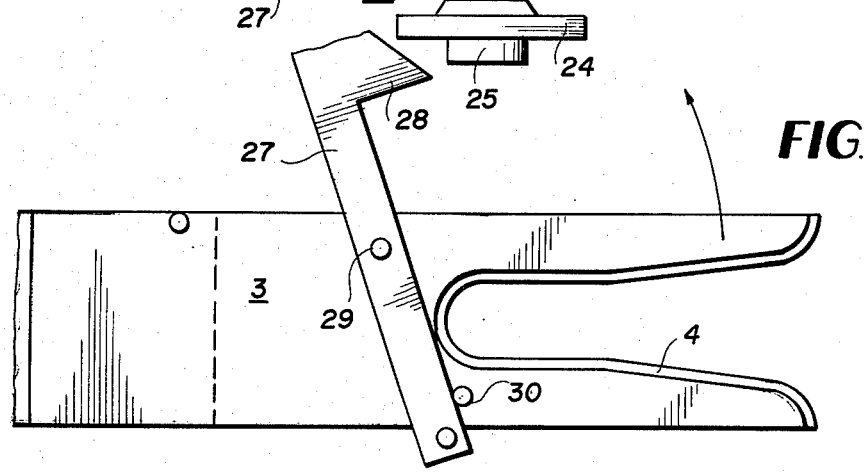
FIG. 7 shows the latching mechanism disengaged.

Referring to the drawings now, wherein like reference numerals refer to like parts throughout the several drawings, reference numeral 10 is directed to the cantilevered medial trailer according to the present invention. The towing vehicle bears the legend V and the terminal trailer legend T.

The medial trailer 10 is provided with a conically depending terminus 31 which fastenes to a fifth wheel type of device on the vehicle V in use, and a conventional support jacks when in storage. In the stored configuration, the rear wheels 13 extend downwardly and provide support.

The means for interconnecting the terminal trailer T and the medial trailer 10 can now be defined. As shown in FIG. 8, the trailer 10 is provided with two elongate frame members 14 suitably cross braced with struts 17. The opening 1 or recessed area is provided with converging braces 2 which terminate substantially at a point where a conventional ball 21 is deployed to coact with the tongue and cup member 20 of the trailer T. The V-shaped support braces 2 may be fashioned to complement and closely follow the V-shaped support frame 22 of the trailer T but this is not required to obtain an affective hookup.

Opposed sides of the trailer T are provided with linear frame members 23 and extending therethrough is a shaft 25 having substantially rectangular sleeve guides 24. The shaft 25 and the members 24 serve to provide second and third areas of retention in conjunction with the ball and tongue arrangement as will now be defined. The shaft 25 is adapted to slide within a tapering channel way 4 disposed upon the medial trailer 10 at the terminal portion of the support frame linear members 14 so that as the channel tapers, the fit between the rod 25 and this cut away portion 4 becomes snug. To retain this shaft 25 therein, a latch 27 is pivoted to the slot supporting member 3 at 29, and a shoulder 28 is provided on the latch to ride over the shaft 25 and retain it thereagainst thereby providing a bar and scissors hitch. Stop members 30 are provided to limit the travel of the latch 27. A spacer 26 may be provided between the frame 23 of trailer T and the sleeve supporting bar 3 so that a resilient interface is provided.

In use and operation, a pulley 8 having cable 5 wrapped therearound is operated as through handle 9 and the cable 5 traverse through a sheave 7 so as to assure the correct linear translation. A terminal portion of the cable 5 remote from the pulley 8 is provided with a hook 6 for engagement with eyelet 19 of the trailer T and the tapering V-shaped configuration of the recess 1 and the tongue of trailer T assures that correct alignment will be effected prior to attaching the trailer T. The wheels 13 are depending and support a portion of the weight of the medial cantilevered trailer 10. After the hook up has been brought about however, these wheels are retracted in a manner now to be explained. Motor 18 pivotally supported on a frame activates an expansible telescoping rod assembly 11 and 12 which is intimately connected to the wheels so that in the extended position, the wheels touch the ground and in the retracted position the tires ride within a well member. The wheels are further pivoted and supported by the link 15 which pivots about point 16 to provide a firm support thereof.

Having thus described the invention, it should be apparent that while the configuration of the trailers suggests its use use with horses and other forms of livestock, these trailers can be suitably fashioned for the construction industry, and other allied fields in which it is sometimes desireable to transport separable trailers to include the possibility that a portion of these vehicles so towed will be subsequently disassociated and remain in situ. Further, the interconnection while found to be effective is merely illustrative and mechanical equivalence are seen to be within the scope in spirit of the invention as set forth hereinabove and as defined hereinbelow by the claims.

What is claimed is:

1. A medial cantilevered trailer supported solely by a towing vehicle and a depending trailer comprising means for detachably connecting the front end of said medial cantilevered trailer to said towing vehicle, retractable means for supporting the front and rear ends of said medial cantilevered trailer in a stationary position, a three way bar and scissors hitch including a ball and socket arrangement on the rear end of said medial cantilevered trailer, and the front end of said depending trailer for supporting said medial cantilevered trailer with said retractable means in a retracted position for towing of said trailers by said towing vehicle.

2. The device of claim 1 wherein the front end of said medial cantilevered trailer is connected to said towing vehicle through a goose neck fifth wheel interconnection.

3. The device of claim 2 wherein said retractable means comprises a pair of transversely spaced wheels mounted for independent movement between a retracte position and an extended position on the rear end of said medial cantilevered trailer, a telescoping rod and sleeve pivotally supported at one extremity on a frame member and at an opposed extremity on each of said wheels, each of said wheels having a link extending between said wheels and a second frame member pivotally connected thereto.

4. The device of claim 3 wherein said telescoping rod and sleeve is power activated.

5. The device of claim 4 wherein said three way bar and scissors hitch comprises a shaft which extends transversely to the direction of travel of said depending trailer and extending outwardly therefrom provided with sleeve elements on the outer ends thereof whereby said shaft is adapted to coact with outwardly extending frame members disposed on said cantilevered medial trailer.

6. The device of claim 5 wherein said outwardly extending frame members are provided with stop elements and narrowing slots to receive said shaft, and a pivoted latch is disposed thereon pivotally movable between an inoperative position and an operative position to override said shaft said pivoted latch being engagable with said stop elements in said inoperative and said operative positions.

7. The device of claim 6 in which the depending trailer is advanced to and fastened with said medial cantilevered trailer by means of a cable disposed on a pulley fastened to said intermediate cantilevered trailer, said cable having a hook on the extremity remote from said pulley adapted to engage an eyelet on said depending trailer, whereby when said cable is wrapped on said pulley, said depending trailer coalesces and abuts with said medial cantilevered trailer.

* * * * *